US 8,108,904 B1
Jan. 31, 2012

(12) United States Patent
Chickering et al.

(54) SELECTIVE PERSISTENT STORAGE OF CONTROLLER INFORMATION

(75) Inventors: Roger Chickering, Granite Bay, CA (US); Paul Funk, Cambridge, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1523 days.

(21) Appl. No.: 11/537,036

(22) Filed: Sep. 29, 2006

(51) Int. Cl.
*G06F 7/04* (2006.01)

(52) U.S. Cl. ............... 726/2; 726/3; 726/4; 709/236; 370/338

(58) Field of Classification Search ............ 726/2, 3, 726/4; 709/236; 370/338
See application file for complete search history.

(56) References Cited

U.S. PATENT DOCUMENTS

| | | | | |
|---|---|---|---|---|
| 2004/0098588 A1* | 5/2004 | Ohba et al. | ........... | 713/169 |
| 2004/0203593 A1* | 10/2004 | Whelan et al. | ........... | 455/411 |
| 2004/0208151 A1* | 10/2004 | Haverinen et al. | ........... | 370/338 |
| 2004/0250117 A1* | 12/2004 | Congdon | ........... | 713/201 |
| 2006/0090208 A1* | 4/2006 | Smith | ........... | 726/26 |
| 2006/0179476 A1* | 8/2006 | Challener et al. | ........... | 726/4 |
| 2006/0259759 A1* | 11/2006 | Maino et al. | ........... | 713/151 |
| 2007/0006282 A1* | 1/2007 | Durham et al. | ........... | 726/2 |
| 2007/0147318 A1* | 6/2007 | Ross et al. | ........... | 370/338 |

\* cited by examiner

*Primary Examiner* — Taghi Arani
*Assistant Examiner* — Jason Lee
(74) *Attorney, Agent, or Firm* — Harrity & Harrity, LLP

(57) ABSTRACT

A controller may receive a request from an endpoint and determine whether the endpoint connects via a first network or a second network. The controller may download first software to the endpoint when the endpoint connects via the first network, where the first software facilitates authentication of the endpoint via another device and instructs the endpoint to not store information regarding the controller. The controller may download second software to the endpoint when the endpoint connects via the second network, where the second software facilitates authentication of the endpoint by the device and instructs the endpoint to store information regarding the controller.

28 Claims, 7 Drawing Sheets

SELECTIVE PERSISTENT STORAGE OF CONTROLLER INFORMATION

BACKGROUND

1. Field of the Invention

Implementations described herein relate generally to network communications and, more particularly, to the selective persistent storage of controller information for different types of network communication.

2. Description of Related Art

Today's enterprise has evolved to enable nearly ubiquitous connectivity for a host of different user groups, including remote/mobile employees, business partners, customers, onsite consultants, and more. Instant access has become almost expected regardless of the user location, whether the user connects as part of the extended enterprise, which can include home, hotels, or kiosks; the distributed enterprise, which can include branch offices; or a campus local area network (LAN).

As this type of unrestricted access becomes commonplace, so too have network security issues. Perimeter security devices have become stretched as the definition of the network's perimeter expands outward. Meanwhile, the traffic load continues to increase. The sophistication of intrusions has also evolved to the point where standard network safeguards simply cannot prevent intruders from entering the enterprise network.

A critical challenge to network security has emerged, especially in the extended enterprise area, with remote and mobile employees, business partners, customers, and others accessing the enterprise network from unknown endpoints and untrusted networks.

SUMMARY

According to one aspect, a device may include logic to receive a request from an endpoint and logic to determine whether the endpoint should authenticate via layer 2 or layer 3. The device may also include logic to download first software to the endpoint when the endpoint should authenticate via layer 2, where the first software may facilitate authentication of the endpoint via another device. The device may further include logic to download second software to the endpoint when the endpoint should authenticate via layer 3, and logic to authenticate the endpoint based on the second software.

According to another aspect, a device may include logic to receive a request from an endpoint and logic to determine whether the endpoint should authenticate via a data link layer or a network layer. The device may also include logic to download first software to the endpoint when the endpoint should authenticate via the data link layer, where the first software may instruct the endpoint to not remember the device but rather to authenticate via a network device via the data link layer. The device may further include logic to download second software to the endpoint when the endpoint should authenticate via the network layer, where the second software may instruct the endpoint to remember the device, and logic to authenticate the endpoint after downloading the second software to the endpoint.

According to yet another aspect, a controller may include means for receiving a request from an endpoint; means for determining whether the endpoint connects via a first network or a second network; means for downloading first software to the endpoint when the endpoint connects via the first network, where the first software may facilitate authentication of the endpoint via another device and instruct the endpoint to not store information regarding the controller; and means for downloading second software to the endpoint when the endpoint connects via the second network, the second software may facilitate authentication of the endpoint by the device and instruct the endpoint to store information regarding the controller.

According to a further aspect, a method, performed by a network controller, may include receiving a request from an endpoint; determining whether the endpoint should authenticate via layer 2 or layer 3; downloading first software to the endpoint when the endpoint should authenticate via layer 2, where the first software may facilitate authentication of the endpoint via a network device and instruct the endpoint to not store information regarding the network controller; and downloading second software to the endpoint when the endpoint should authenticate via layer 3, where the second software may facilitate authentication of the endpoint by the network controller and instruct the endpoint to store information regarding the network controller.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Implementations described herein permit a controller to install software, possibly in the form of an authentication module and/or a configuration module, on endpoints seeking to connect to a protected network. The software may facilitate authentication of the endpoints. The software may also configure the endpoints based on whether the endpoints authenticate via layer 3 or layer 2. In a layer 3 situation, the software may configure the endpoint to authenticate to the controller and remember the controller when the endpoint subsequently seeks to authenticate via layer 3. In a layer 2 situation, the software may configure the endpoint to authenticate to another network device, such as an 802.1X-enabled switch, and not remember the controller when the endpoint subsequently seeks to authenticate via layer 2 or layer 3. Thus, the software may permit the endpoint to authenticate in either of the two situations, remember the controller is the layer 3 situation, and not remember the controller in the layer 2 situation.

As used herein, layer 2 may include the data link layer, and layer 3 may include the network layer. When authenticating via layer 2, the endpoint may use a layer 2 authentication protocol, such as the IEEE 802.1X protocol, to authenticate to the network device providing network access. The network device, in turn, may use an AAA protocol, such as the RADIUS protocol, to use the controller as an authentication authority. In other words, the endpoint in the layer 2 situation may still authenticate to the controller, but from the endpoint's point-of-view, the endpoint may send authentication messages directly to the network device. When authenticating via layer 3, the endpoint already has network access of some sort and may exchange TCP/IP packets directly with the controller. In order to do this, the endpoint needs to be aware of the network address of the controller. In contrast, for layer 2 authentication, the endpoint needs to know to participate in an 802.1X authentication with the network device providing access to the network.

Exemplary Network

Figure 1:
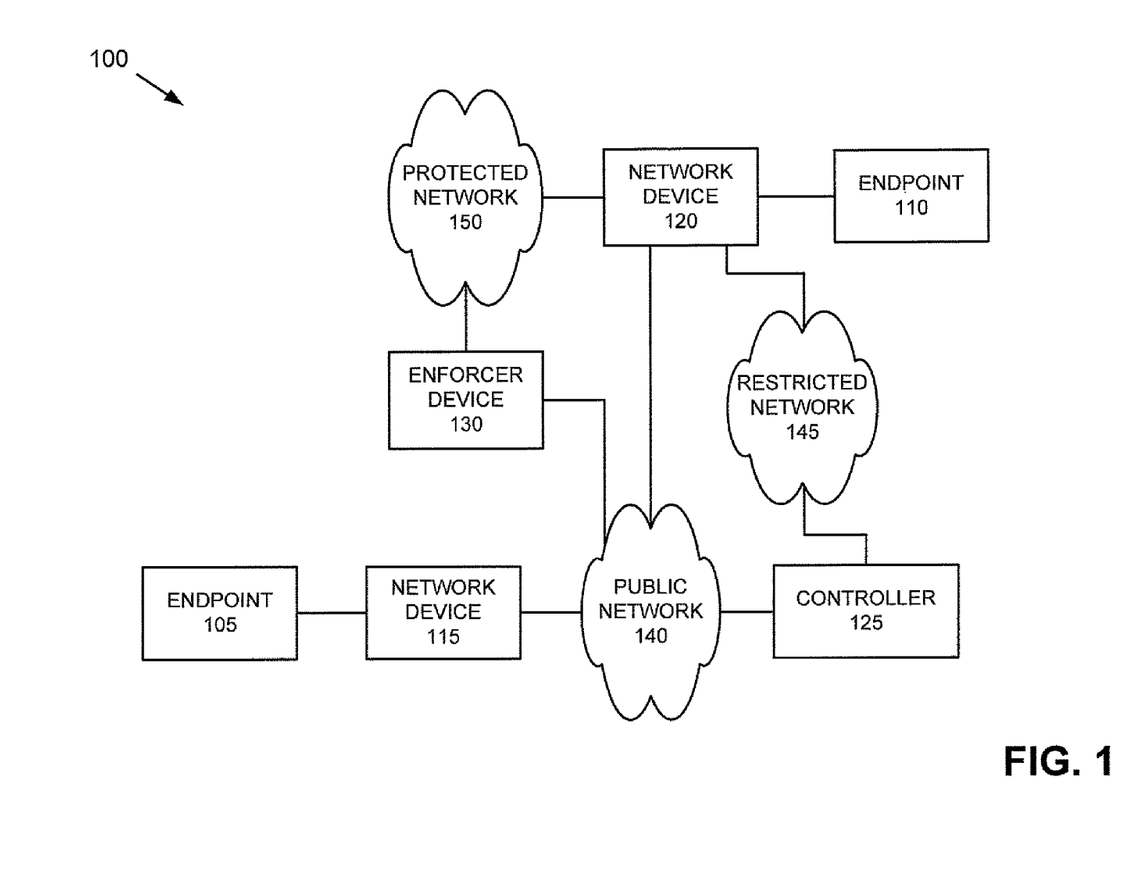
FIG. 1 is an exemplary diagram of a network in which systems and methods described herein may be implemented.

FIG. 1 is an exemplary diagram of a network 100 in which systems and methods described herein may be implemented. Network 100 may include endpoints 105 and 110, network devices 115 and 120, controller 125, and enforcer device 130 connected via public network 140, restricted network 145, and/or protected network 150. As shown in FIG. 1, endpoint 105 may connect to public network 140 via network device 115; endpoint 110 may connect to public network 140, restricted network 145, and protected network 150 via network device 120; controller 125 may connect to public network 140 and restricted network 145; and enforcer device 130 may connect to public network 140 and protected network 150. While FIG. 1 shows a particular number and arrangement of components, in practice, there may be more or fewer components and/or a different arrangement of components. Also, the particular connections shown in FIG. 1 can include wireless and/or wired connections.

Endpoints 105 and 110 may include any type of computation or communication device, such as a personal computer, a lap top, a telephone device (e.g., cordless, wired, or cellular), a personal digital assistant (PDA), or another type of device. Endpoints 105 and 110 may use browser software or another type of graphical user interface (GUI) to interface to public network 140, restricted network 145, and/or protected network 150.

Network device 115 may include a device, such as a firewall or a switch, that may provide unrestricted access (e.g., full Internet Protocol (IP) connectivity) to public network 140. Network device 120 may include a device, such as a switch, that may control access to public network 140, restricted network 145, and protected network 150. In one implementation, network device 120 may include an 802.1X-enabled switch.

Controller 125 may include a device that may facilitate authentication of endpoints 105 and 110 and control access by endpoints 105 and 110 to protected network 150. Controller 125 may download software (e.g., an authentication module and/or a configuration script) to endpoints 105 and 110. The authentication module may facilitate authentication of endpoints 105 and 110. The configuration module may instruct endpoints 105 and 110 on how to authenticate. In this manner, controller 125 may facilitate authentication based on whether endpoints 105 and 110 authenticate via layer 3 or layer 2, as described below.

Enforcer device 130 may include a device, such as a firewall, that may control access to protected network 150. In one implementation, enforcer device 130 may receive instructions from controller 125 on whether to permit access to protected network 150.

Public network 140 may include a public, untrusted network, such as a wide area network (WAN), a telephone network (e.g., the Public Switched Telephone Network (PSTN) or a cellular network), the Internet, or a combination of networks. Restricted network 145 may include a network that provides limited access to a limited set of components connected to restricted network 145. Protected network 150 may include a private, trusted network that can take the form of a local area network (LAN) or WAN. In one implementation, protected network 150 may include a company intranet.

Exemplary Controller Architecture

Figure 2:
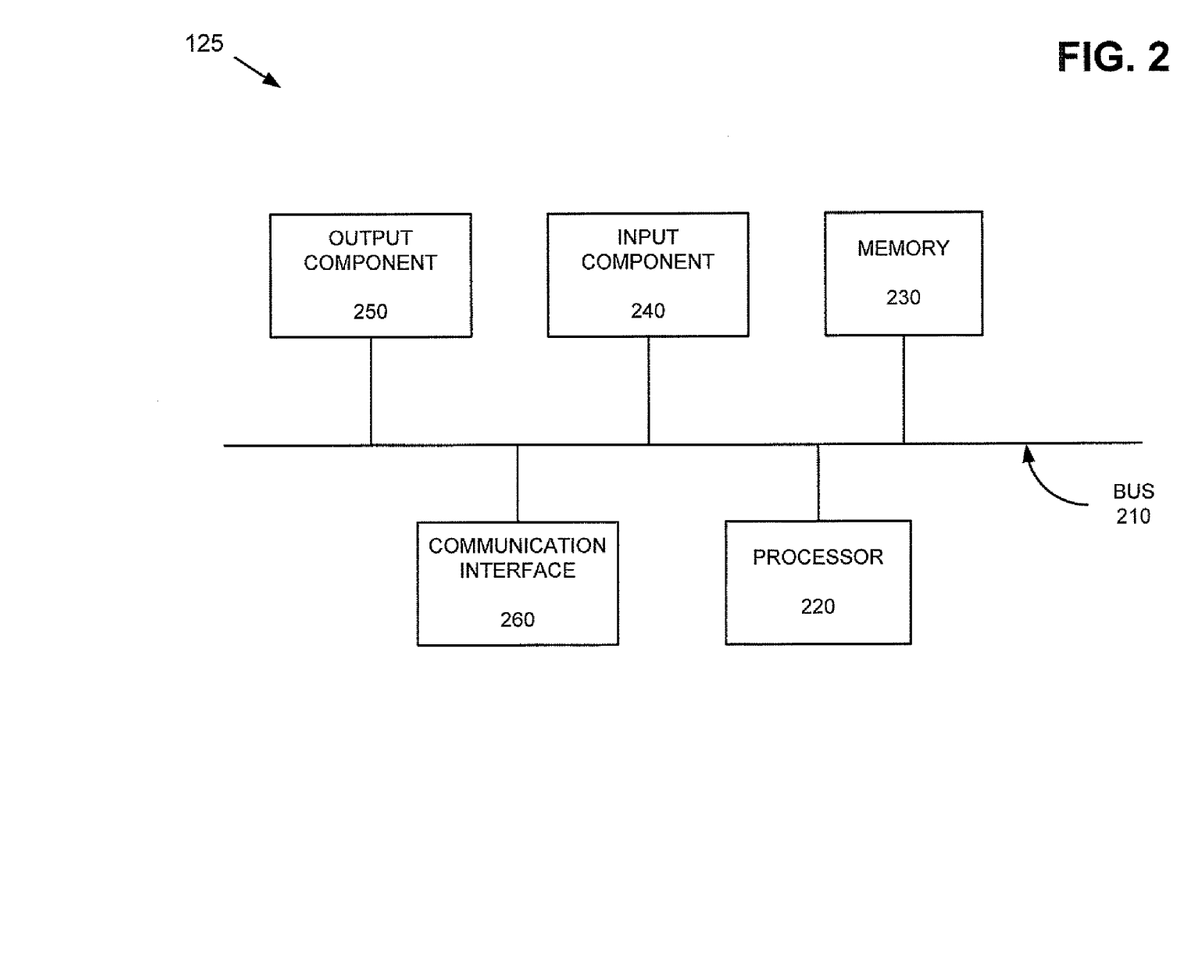
FIG. 2 is an exemplary block diagram of a device that may correspond to an endpoint, a network device, and/or a controller of FIG. 1.

FIG. 2 is an exemplary block diagram of controller 125. Endpoints 105 and 110 and network devices 115 and 120 may include similar elements.

As shown in FIG. 2, controller 125 may include a bus 210, a processor 220, a memory 230, an input component 240, an output component 250, and a communication interface 260. Bus 210 may include a path that permits communication among the elements of controller 125.

Processor 220 may include one or more processors, microprocessors, or any kind of processing logic that may interpret and execute instructions. Memory 230 may include a random access memory (RAM) or another type of dynamic storage device that may store information and instructions for execution by processor 220; a read only memory (ROM) device or another type of static storage device that may store static information and instructions for use by processor 220; a removable memory device; and/or a magnetic and/or optical recording medium and its corresponding drive.

Input component 240 may include a mechanism that permits an operator to input information to controller 125, such as a web browser or command line interface, a control button or switch, a keyboard, a mouse, etc. Output component 250 may include a mechanism that outputs information to the operator, such as a light emitting diode (LED) or some form of display, a speaker, etc. Communication interface 260 may include any receiver, transmitter, and/or transceiver-like mechanism(s) that may enable controller 125 to communicate with other devices and/or systems.

Controller 125 may perform certain operations, as described in detail below. Controller 125 may perform these operations in response to processor 220 executing software instructions contained in a computer-readable medium, such as memory 230. A computer-readable medium may be defined as a physical or logical memory device and/or carrier wave.

The software instructions may be read into memory 230 from another computer-readable medium or from another device via communication interface 260. The software instructions contained in memory 230 may cause processor 220 to perform processes that will be described later. Alternatively, hardwired circuitry may be used in place of or in combination with software instructions to implement processes described herein. Thus, implementations described herein are not limited to any specific combination of hardware circuitry and software. The term "logic," as used herein, may refer to any form of hardware circuitry and/or software.

Exemplary Layer 3 (L3) Connection

Figure 3:
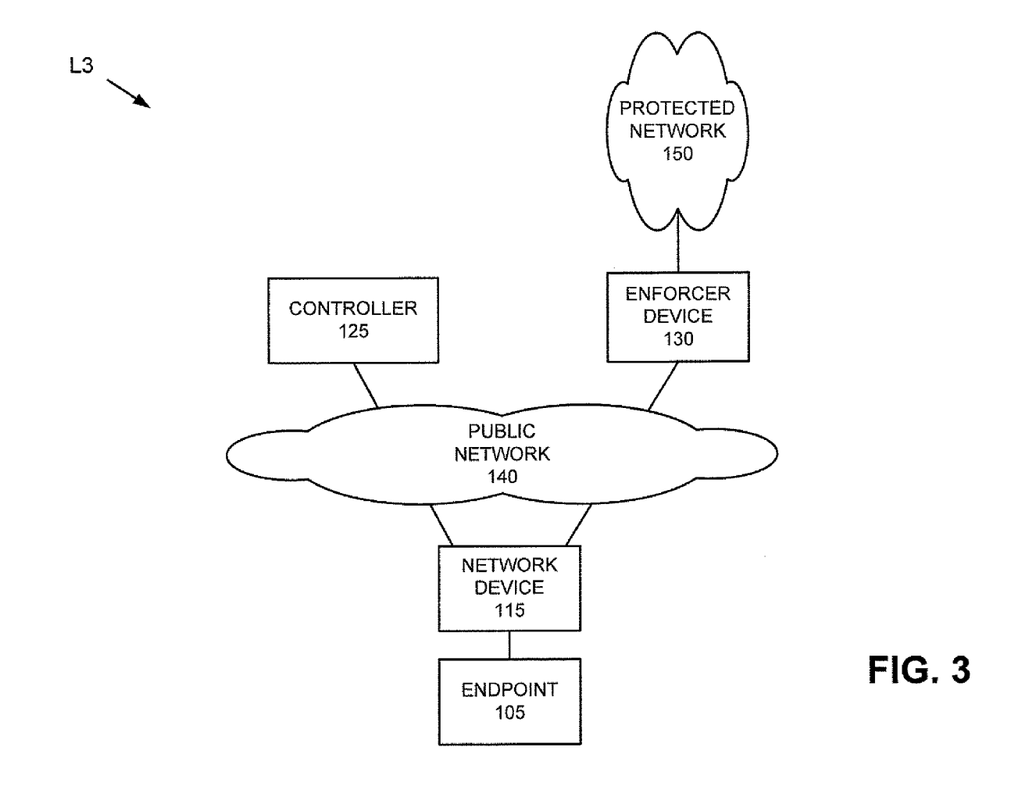
FIG. 3 is an exemplary diagram of components of FIG. 1 that may participate in a layer 3 authentication of an endpoint.

FIG. 3 is an exemplary diagram of components of FIG. 1 that may participate in a layer 3 authentication of endpoint 105. As shown in FIG. 3, endpoint 105 may connect to network device 115, which can connect to controller 125 and enforcer device 130 via public network 140. Enforcer device 130 may regulate access to protected network 150.

Figure 4:
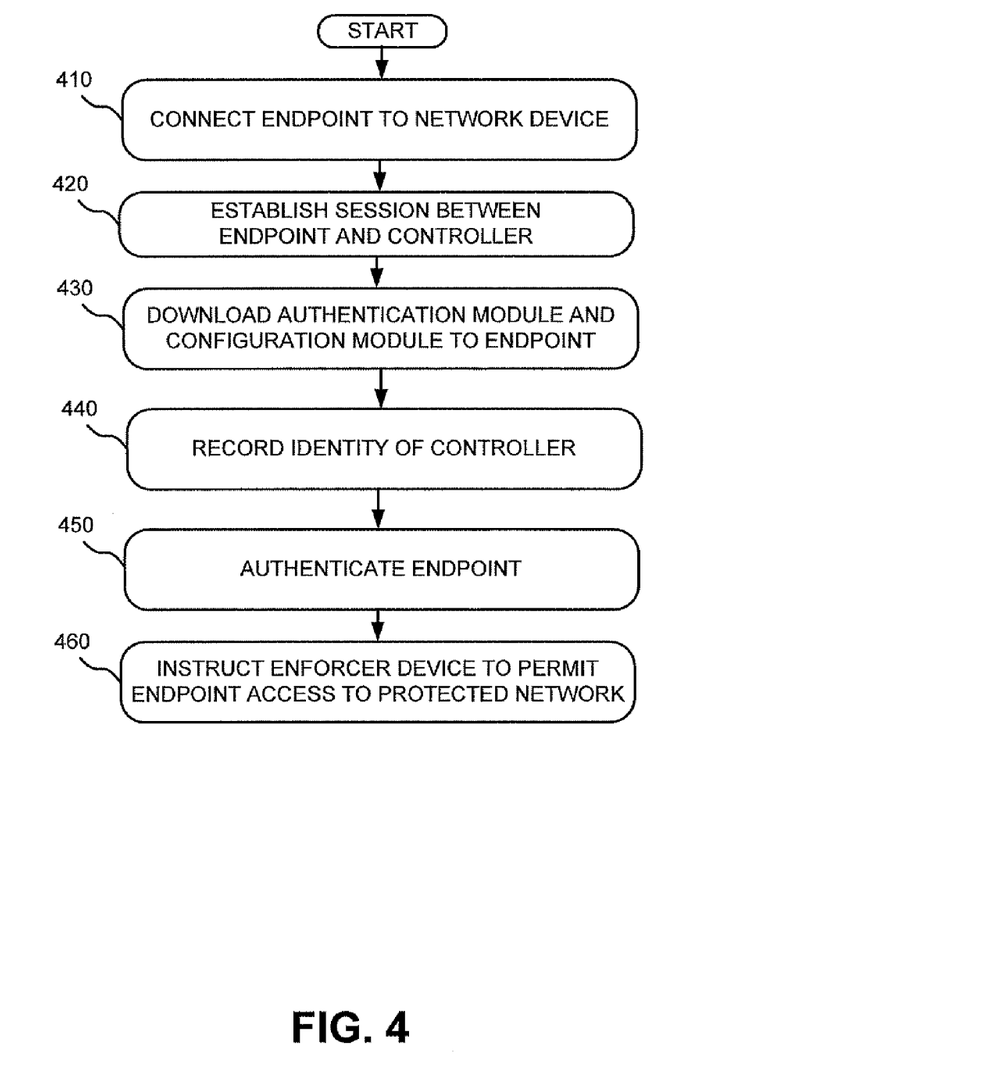
FIG. 4 is a flowchart of exemplary processing for authenticating an endpoint via layer 3.

FIG. 4 is a flowchart of exemplary processing for authenticating an endpoint via layer 3. In the description to follow, assume that endpoint 105 attempts to connect to protected network 150 for the first time via network device 115. Processing may begin with the connection of endpoint 105 to network device 115 (block 410). Endpoint 105 may connect to network device 115 via a direct connection or an indirect connection (e.g., via a LAN), which can be wireless or wired.

Once connected to network device 115, a session may be established between endpoint 105 and controller 125 (block 420). For example, a user of endpoint 105 may open a browser application (or another GUI) on endpoint 105. The user might then enter an address (e.g., a Uniform Resource Locator (URL)) associated with controller 125. Controller 125 may determine that endpoint 105 is attempting to authenticate via layer 3 (e.g., based on the network via which endpoint 105 connects, which may be determined based on the network address associated with endpoint 105).

An authentication module and a layer 3 configuration module may be downloaded from controller 125 to endpoint 105 (block 430). The authentication module may include authentication software that may facilitate authentication of endpoint 105. The layer 3 configuration module may instruct endpoint 105 on how endpoint 105 should authenticate.

The layer 3 configuration module may instruct endpoint 105 to authenticate to controller 125. For example, the layer 3 configuration module may instruct endpoint 105 that endpoint 105 needs to communicate with controller 125 the next time endpoint 105 wants to connect to protected network 150. Accordingly, the identity of controller 125 may be recorded by endpoint 105 (block 440). For example, the layer 3 configuration module may instruct endpoint 105 to store a configuration entry in a configuration table. The configuration entry may include information regarding controller 125, such as the address (e.g., URL) of controller 125. Over time, as endpoint 105 connects to various protected networks from various locations, endpoint 105 may accumulate a set of configuration entries (for a set of different controllers 125) in the configuration table. When endpoint 105 later attempts to connect to protected network 150, endpoint 105 may automatically connect to one of controllers 125 identified in the configuration table without the user having to enter the address of controller 125. Controller 125 may authenticate endpoint 105, as described below, without the need to download the authentication module or the layer 3 configuration module (since endpoint 105 already includes this software).

Endpoint 105 may be authenticated (block 450). For example, the authentication module may interact with controller 125 to authenticate endpoint 105. In one implementation, controller 125 may determine whether endpoint 105 is compliant with a security policy associated with protected network 150. For example, the authentication module may analyze predefined and customizable criteria on endpoint 105, including running processes, port activity, application authenticity, the presence of malware (e.g., viruses, worms, Trojan horses, spyware, and/or adware), and/or the presence/ version of security software (e.g., malware protection software). The authentication module may return its analysis results to controller 125. If endpoint 105 is determined to be non-compliant with the security policy due, for example, to the absence of certain security software on endpoint 105, controller 125 may inform endpoint 105 how the non-compliance may be remedied.

Alternatively, or additionally, controller 125 may verify the identity of endpoint 105 (which may include a verification of the identity of the user associated with endpoint 105) and/or determine the ability of endpoint 105 to access protected network 150 (e.g., identify what endpoint 105 is permitted to access in protected network 150, if anything). For example, controller 125 may interact with one or more authentication servers, identity stores, and/or authorization stores to verify the identity of endpoint 105 and/or determine the ability of endpoint 105 to access protected network 150.

Based on the compliance of endpoint 105 with the security policy, the verified identity of endpoint 105, and/or the determined ability of endpoint 105 to access protected network 150, controller 125 may provide session-specific, conditional access to protected network 150. It may be possible for controller 125 to grant endpoint 105 varying degrees of access to protected network 150, from unrestricted access to restricted access (e.g., access limited to a particular resource, or resources, on protected network 150).

When endpoint 105 is properly authenticated, enforcer device 130 may be instructed to permit endpoint 105 to access protected network 150 (block 460). For example, controller 125 may send a message to enforcer device 130 to instruct enforcer device 130 to permit endpoint 105 access to protected network 150. In one implementation, the message from controller 125 may indicate the degree of access granted to endpoint 105 (e.g., whether endpoint 105 is granted unrestricted access, identification of one or more resources to which endpoint 105 is granted access, etc.).

Exemplary Layer 2 (L2) Connection

Figure 5:
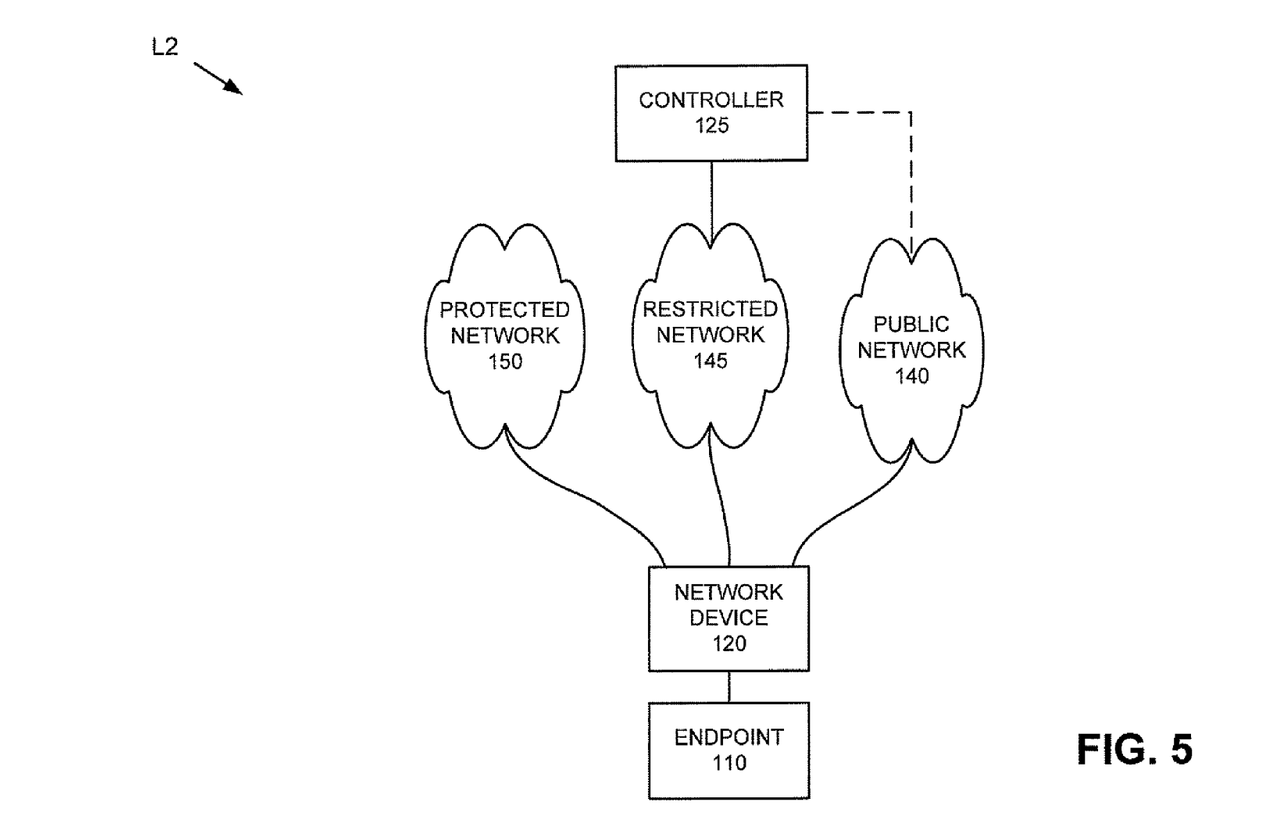
FIG. 5 is an exemplary diagram of components of FIG. 1 that may participate in a layer 2 authentication of an endpoint.

FIG. 5 is an exemplary diagram of components of FIG. 1 that may participate in a layer 2 authentication of endpoint 110. As shown in FIG. 5, endpoint 110 may connect to network device 120, which can connect to controller 125 via restricted network 145 and, after authentication, via public network 140, and protected network 150.

Figure 6:
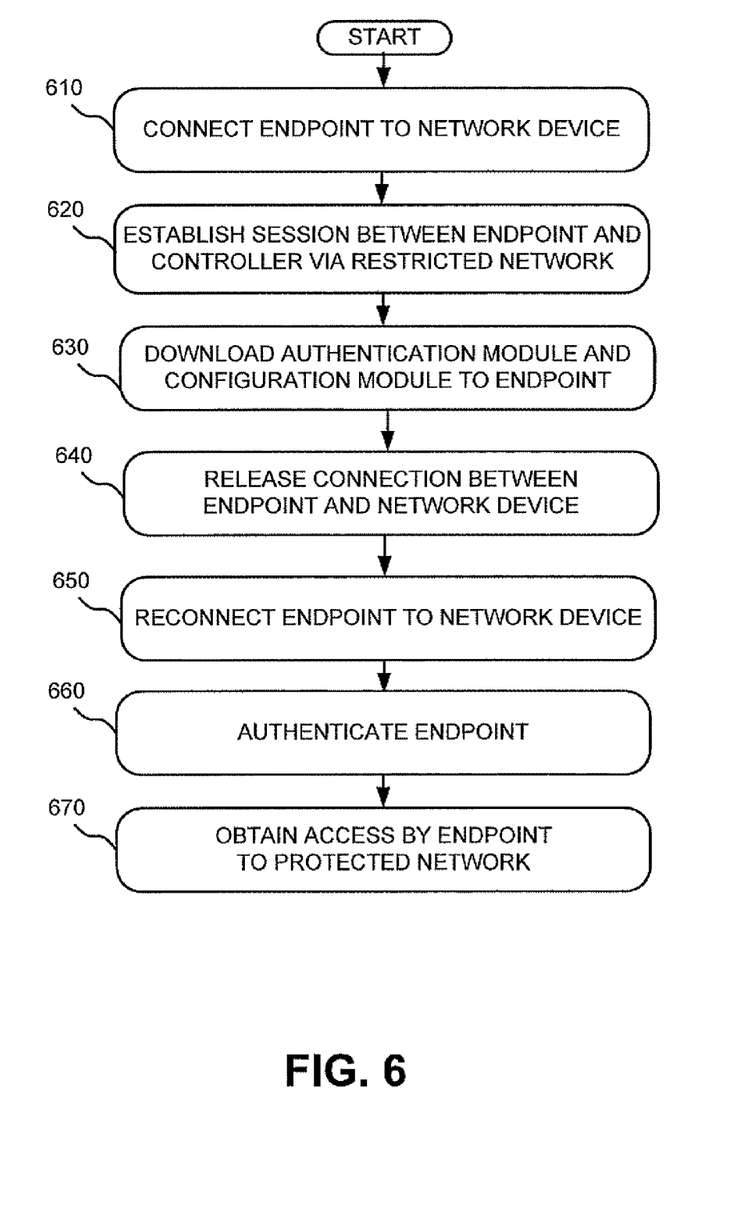
FIG. 6 is a flowchart of exemplary processing for authenticating an endpoint via layer 2.

FIG. 6 is a flowchart of exemplary processing for authenticating an endpoint via layer 2. In the description to follow, assume that endpoint 110 attempts to connect to protected network 150 for the first time via network device 120. Processing may begin with the connection of endpoint 110 to network device 120 (block 610). Endpoint 110 may connect to network device 120 via a wired or wireless connection.

Once endpoint 110 connects to network device 120, network device 120 waits for endpoint 110 to request authentication. In this case, however, endpoint 110 does not include the software necessary to authenticate to network device 120. Network device 120 may be configured to permit unauthenticated endpoints access only to restricted network 145. Thus, when a predetermined amount of time elapses without endpoint 110 authenticating, network device 120 may permit endpoint 110 access to restricted network 145.

A session may be established between endpoint 110 and controller 125 via restricted network 145 (block 620). For example, a user of endpoint 110 may open a browser application (or another GUI) on endpoint 110. In this case, endpoint 110 may be able to access only controller 125 (regardless of what address (e.g., URL) the user might enter into the browser application). Controller 125 may determine that endpoint 110 is attempting to authenticate via layer 2 (e.g., based on the network via which endpoint 110 connects, which may be determined based on the network address associated with endpoint 110 being in a particular range of addresses).

An authentication module and a layer 2 configuration module may be downloaded from controller 125 to endpoint 110 (block 630). The authentication module may include authentication software that may facilitate authentication of endpoint 110. The authentication module may be the same as or different from the authentication module downloaded in the layer 3 situation. The layer 2 configuration module may instruct endpoint 110 on how endpoint 110 should authenticate.

The layer 2 configuration module may instruct endpoint 110 to authenticate to network device 120. For example, the layer 2 configuration module may instruct endpoint 110 that endpoint 110 needs to release its connection to network device 120 and reestablish its connection to network device 120 to authenticate. Accordingly, endpoint 110 need not store a configuration entry for controller 125 in the configuration table. If endpoint 110 were to store a configuration entry for controller 125, endpoint 110 might attempt to connect to controller 125 after endpoint 110 authenticates to network device 120. This would be unnecessary since endpoint 110 has already been authenticated.

The connection between endpoint 110 and network device 120 may be released and reestablished (blocks 640 and 650). For example, based on the layer 2 configuration module, endpoint 110 may release its connection to network device 120 and reconnect to network device 120, which may cause an authentication request to be sent to network device 120. The release and reestablishment of the connection may be automatically performed or performed under user control.

Endpoint 110 may be authenticated (block 660). For example, the authentication module on endpoint 110 may interact with network device 120 to authenticate endpoint 110. In one implementation, network device 120 may determine whether endpoint 110 is compliant with a security policy associated with protected network 150. For example, the authentication module may analyze predefined and customizable criteria on endpoint 110, including running processes, port activity, application authenticity, the presence of malware (e.g., viruses, worms, Trojan horses, spyware, and/or adware), and/or the presence/version of security software (e.g., malware protection software). The authentication module may return its analysis results to network device 120. If endpoint 110 is determined to be non-compliant with the security policy due, for example, to the absence of certain security software on endpoint 110, network device 120 may inform endpoint 110 how the non-compliance can be remedied.

Alternatively, or additionally, network device 120 may verify the identity of endpoint 110 (which may include a verification of the identity of the user associated with endpoint 110) and determine the ability of endpoint 110 to access protected network 150. For example, network device 120 may interact with one or more authentication servers, identity stores, and/or authorization stores to verify the identity of endpoint 110 and determine the ability of endpoint 110 to access protected network 150.

In one implementation, when authenticating via layer 2, network device 120 may be configured to forward authentication requests to controller 125. Network device 120 may interact with controller 125 using a protocol, such as the RADIUS protocol, to authenticate endpoint 110. In this case, controller 125 may authenticate endpoint 110, while network device 120 may serve as a conduit for messages from endpoint 110 to controller 125. Controller 125 may inform network device 120 of what kind of access is to be granted to endpoint 110 via a message, such as a RADIUS message. In this case, endpoint 110 need not explicitly know about controller 125 to authenticate. Instead, endpoint 110 simply needs to know to do a layer 2 authentication to get on protected network 150.

Based on the compliance of endpoint 110 with the security policy, the verified identity of endpoint 110, and/or the determined ability of endpoint 110 to access protected network 150, network device 120 may provide session-specific, conditional access to protected network 150. It may be possible for network device 120 to grant endpoint 110 varying degrees of access to protected network 150, from unrestricted access to restricted access (e.g., access limited to a particular resource on protected network 150).

Endpoint 110 may access resources on protected network 150 (block 670). For example, endpoint 105 may attempt to access protected network 150 via network device 120. Network device 120 may permit endpoint 110 to access protected network 150 (whether restricted or unrestricted access).

During the layer 2 authentication, endpoint 110 may obtain some parameters that it may use to establish a layer 3 control channel with controller 125 after endpoint 110 properly authenticates. Endpoint 110 does not need to authenticate again with controller 125. Once the control channel is established, controller 125 may provision access to protected resources through an enforcer device, such as enforcer device 130 (FIG. 1). Thus, even with layer 2 authentication, a layer 3 control channel can be established between endpoint 110 and controller 125, and access to enforcer-protected resources can be selectively granted based on policies on controller 125 and the identity and health of endpoint 110.

Controller Processing

Figure 7:
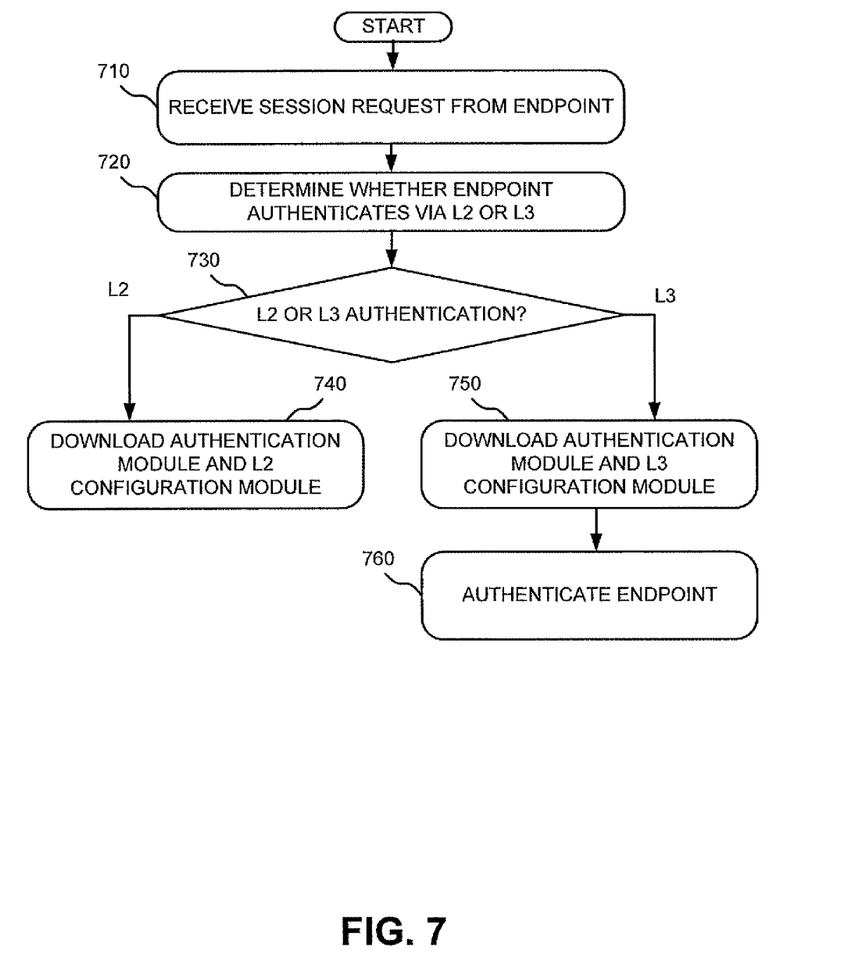
FIG. 7 is a flowchart of exemplary processing by the controller of FIG. 1 for interacting with an endpoint seeking to authenticate via layer 2 or layer 3.

FIG. 7 is a flowchart of exemplary processing by controller 125 for interacting with an endpoint seeking to authenticate via layer 2 or layer 3. Processing may begin with controller 125 receiving a session request from an endpoint (block 710). As explained above, in both the layer 2 and layer 3 situations, a user of an endpoint may use a browser application (or another GUI) to access controller 125.

Controller 125 may determine whether the endpoint authenticates via layer 2 or layer 3 (block 720). Controller 125 may make this determination based on whether the endpoint connects to controller 125 via restricted network 145 (e.g., when the address of the endpoint falls within a certain range of addresses). If the endpoint connects to controller 125 via restricted network 145, then controller 125 determines that the endpoint should authenticate via layer 2. Otherwise, controller 125 determines that the endpoint should authenticate via layer 3.

If the endpoint should authenticate via layer 2 (block 730—L2), then controller 125 may download the authentication module and the layer 2 configuration module to the endpoint (block 740). As explained above, the authentication module may determine the endpoint's compliance to a security policy. The layer 2 configuration module may instruct the endpoint to authenticate to a network device rather than controller 125 and, thus, need not store a layer 3 configuration entry for controller 125. As explained above, when the endpoint authenticates to the network device, the network device may act as a conduit by sending authentication messages from the endpoint to controller 125. Once properly authenticated, the endpoint may establish a control channel with controller 125 so that the endpoint can gain access to one or more enforcer-protected resources.

If the endpoint should authenticate via layer 3 (block 730—L3), then controller 125 may download the authentication module and the layer 3 configuration module to the endpoint (block 750). As explained above, the authentication module may determine the endpoint's compliance to a security policy. The layer 3 configuration module may instruct the endpoint to authenticate to controller 125 and, thus, should store a layer 3 configuration entry for controller 125.

Controller 125 may also authenticate the endpoint (block 760). As explained above, the authentication module may determine whether the endpoint is compliant with a security policy associated with protected network 150 and return a result of its determination to controller 125. Controller 125 may verify the identity of the endpoint and determine the ability of the endpoint to access protected network 150. Based on the compliance of the endpoint with the security policy, the verified identity of the endpoint, and/or the determined ability of the endpoint to access protected network 150, controller 125 may provide session-specific, conditional access to protected network 150 by the endpoint. In this case, controller 125 may send a message instructing enforcer device 130 to permit the endpoint access to protected network 150.

CONCLUSION

Implementations described herein may configure a controller to recognize endpoints that should authenticate via layer 3 or layer 2. In the layer 3 situation, the controller may configure the endpoint to remember the controller and authenticate to the controller when the endpoint subsequently attempts to gain access to the network. In the layer 2 situation, the controller may configure the endpoint to not remember the controller and to instead authenticate to another network device. In the layer 2 situation, the network device can be configured to forward authentication requests to the controller using a protocol, such as the RADIUS protocol.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 4, 6, and 7, the order of the acts may differ in other implementations consistent with the principles of the invention. Also, non-dependent acts may be performed in parallel.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A device, comprising:
   a memory to store instructions; and
   a processor to execute the instructions to:
   receive a request from an endpoint,
   determine whether the endpoint is to authenticate via one of layer 2 or layer 3,
   download first software to the endpoint when the endpoint is to authenticate via layer 2, the first software causing authentication of the endpoint via another device and instructing the endpoint to not store information regarding the device,
   download second software to the endpoint when the endpoint is to authenticate via layer 3,
   where the second software is different from the first software, and
   authenticate the endpoint based on the second software when the endpoint is to authenticate via layer 3.

2. The device of claim 1, where, when determining whether the endpoint is to authenticate via layer 2 or layer 3, the processor is further to:
   determine whether the endpoint is accessing the device from a particular network.

3. The device of claim 2, where, when determining whether the endpoint is accessing the device from a particular network, the processor is further to:
   determine whether an address associated with the endpoint falls within a particular range of addresses, and
   determine that the endpoint is accessing the device from the particular network when the address associated with the endpoint falls within the particular range of addresses.

4. The device of claim 2, where, when determining whether the endpoint is to authenticate via layer 2 or layer 3, the processor is further to:
   determine that the endpoint is to authenticate via layer 3 when the endpoint accesses the device from a network other than the particular network.

5. The device of claim 1, where the first software includes an authentication module and a layer 2 configuration module,
   where the authentication module is to determine whether the endpoint complies with a security policy, and
   where the layer 2 configuration module is to instruct the endpoint to authenticate via layer 2 and to not store the information regarding the device.

6. The device of claim 1, where the second software includes an authentication module and a layer 3 configuration module.

7. The device of claim 6, where the authentication module is to determine whether the endpoint complies with a security policy, and the layer 3 configuration module is to instruct the endpoint to authenticate to the device and to store information regarding the device.

8. The device of claim 7, where, when authenticating the endpoint, the processor is further to:
   receive, from the authentication module, information regarding a compliance of the endpoint with the security policy,
   verify an identity of the endpoint or a user operating the endpoint,
   determine an ability of the endpoint to access a protected network, and
   determine whether to grant the endpoint access to the protected network based on at least one of the received information regarding the compliance of the endpoint with the security policy, the verified identity of the endpoint, or the determined ability of the endpoint to access the protected network.

9. The device of claim 1, where, when authenticating the endpoint based on the second software, the processor is further to:
authenticate the endpoint further based on at least one of a verified identity of the endpoint or a user operating the endpoint, or a determined ability of the endpoint to access a protected network.

10. The device of claim 1, where, when authenticating the endpoint based on the second software, the processor is further to:
determine whether to grant, the endpoint, access to a protected network based on an analysis performed by the second software on the endpoint.

11. The device of claim 10, where the processor is further to:
transmit, to a network device and based on determining whether to grant the endpoint access to the protected network, a message that indicates whether the network device is to grant the endpoint access to the protected network.

12. The device of claim 1, where the processor is further to:
establish a layer 3 control channel with the endpoint after the endpoint is authenticated via layer 2, and
grant access to network resources based on the established layer 3 control channel.

13. A device, comprising:
a memory to store instructions; and
a processor to execute the instructions to:
receive a request from an endpoint,
determine whether the endpoint is to authenticate via a data link layer or a network layer,
download first software to the endpoint when the endpoint is to authenticate via the data link layer, the first software instructing the endpoint to not store information regarding the device and to authenticate via a network device using the data link layer,
download second software to the endpoint when the endpoint is to authenticate via the network layer, where the second software includes an authentication module to determine whether the endpoint complies with a particular security policy and a configuration module to instruct the endpoint to store information regarding the device,
cause, based on the first software, the endpoint to authenticate via the network device when the first software is downloaded to the endpoint, and
authenticate the endpoint when the second software is downloaded to the endpoint.

14. A controller, comprising:
a memory to store instructions; and
a processor to execute the instructions to:
receive a request from an endpoint,
determine whether the endpoint connects via a first network or a second network that is different from the first network,
download first software to the endpoint when the endpoint connects via the first network, the first software facilitating authentication of the endpoint via a first device and instructing the endpoint to not store information regarding the controller,
download second software to the endpoint when the endpoint connects via the second network, the second software facilitating authentication of the endpoint by the controller and instructing the endpoint to store information regarding the controller,
authenticate the endpoint based on the second software when the second software is downloaded to the endpoint, and
send a message to a second device instructing the second device to permit the endpoint to access a third network when the endpoint has been successfully authenticated based on the second software, where the third network is different from the first network and the second network.

15. A method performed by a network controller, the method comprising:
receiving, by the network controller, a request from an endpoint to access network resources;
determining, by the network controller, whether the endpoint is to authenticate via layer 2 or layer 3;
downloading, by the network controller, first software to the endpoint when the endpoint is to authenticate via layer 2, the first software causing the endpoint to authenticate via a network device and instructing the endpoint to not store information regarding the network controller,
where the network device authorizes the endpoint to access the network resources when the endpoint has been authenticated via the network device;
downloading, by the network controller, second software to the endpoint when the endpoint is to authenticate via layer 3, the second software causing the endpoint to be authenticated by the network controller and instructing the endpoint to store information regarding the network controller;
authenticating, by the network controller, the endpoint based on the second software when the endpoint is to authenticate via layer 3; and
authorizing, by the network controller, the endpoint to access the network resources after the endpoint has been authenticated based on the second software.

16. The method of claim 15, where determining whether the endpoint is to authenticate via layer 2 or layer 3 includes:
determining whether the endpoint is accessing the network controller via a particular network, and
determining that the endpoint is to authenticate via layer 2 when the endpoint accesses the network controller via the particular network.

17. The method of claim 16, where determining whether the endpoint is accessing the network controller via a particular network includes:
determining whether an address associated with the endpoint falls within a range of addresses, and
determining that the endpoint is accessing the network controller via the particular network when the address associated with the endpoint falls within the range of addresses.

18. The method of claim 16, where determining whether the endpoint is to authenticate via layer 2 or layer 3 further includes:
determining that the endpoint is to authenticate via layer 3 when the endpoint accesses the network controller via a network other than the particular network.

19. The method of claim 15, where the first software includes an authentication module and a layer 2 configuration module,
where the authentication module is to determine whether the endpoint complies with a security policy, and where the layer 2 configuration module is to instruct the endpoint to obtain authentication from the network device and to not store the information regarding the network controller.

20. The method of claim 15, where the second software includes an authentication module and a layer 3 configuration module.

21. The method of claim 20, where the authentication module is to determine whether the endpoint complies with a security policy, and the layer 3 configuration module is to instruct the endpoint to obtain authentication from the network controller and to store information regarding the network controller.

22. The method of claim 21, further comprising:
receiving, from the authentication module, information regarding a compliance of the endpoint with the security policy;
verifying an identity of the endpoint or a user operating the endpoint;
determining an ability of the endpoint to access a protected network; and
determining whether to grant the endpoint access to the protected network based on at least one of the received information regarding the compliance of the endpoint with the security policy, the verified identity of the endpoint or the user operating the endpoint, or the determined ability of the endpoint to access the protected network.

23. The method of claim 15, further comprising:
authenticating the endpoint to determine whether to grant the endpoint access to a protected network based on at least one of:
an analysis of the endpoint by the second software,
verification of an identity of the endpoint or a user operating the endpoint, or
a determination of an ability of the endpoint to access the protected network.

24. The method of claim 15, further comprising:
determining whether to grant the endpoint access to a protected network based on an analysis, performed by the second software, on the endpoint.

25. The method of claim 24, further comprising:
transmitting, to another network device and based on determining whether to grant the endpoint access to the protected network, a message that indicates whether the other network device is to grant the endpoint access to the protected network.

26. The method of claim 15, further comprising:
establishing a layer 3 control channel with the endpoint after the endpoint is authenticated via layer 2; and
granting access to the network resources based on the established layer 3 channel.

27. The device of claim 13, where the first software includes a first module and a second module,
where the first module is to determine whether the endpoint complies with a security policy, and
where the second module is to instruct the endpoint to:
authenticate via the network device using the data link layer, and
not store the information regarding the device.

28. The controller of claim 14, where the first device is associated with layer 2,
where the first software includes a module,
where the second module is to instruct the endpoint to authenticate via layer 2 and instruct the endpoint to not store the information regarding the controller.

* * * * *